(12) United States Patent
Blahut

(10) Patent No.: US 6,796,555 B1
(45) Date of Patent: Sep. 28, 2004

(54) CENTRALIZED VIDEO CONTROLLER FOR CONTROLLING DISTRIBUTION OF VIDEO SIGNALS

(75) Inventor: Donald E. Blahut, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/356,978

(22) Filed: Jul. 19, 1999

(51) Int. Cl.$^7$ .............................................. M04L 12/28
(52) U.S. Cl. .................................. 270/395.1; 370/431
(58) Field of Search ................................ 370/390, 392, 370/395.1, 389, 397, 396, 395.64, 401, 409, 431; 725/81, 87, 93

(56) References Cited

U.S. PATENT DOCUMENTS

| | | | |
|---|---|---|---|
| 4,566,034 A | | 1/1986 | Harger et al. |
| 5,574,440 A | | 11/1996 | Kurtz |
| 5,708,961 A | * | 1/1998 | Hylton et al. ................. 725/81 |
| 5,721,829 A | * | 2/1998 | Dunn et al. .................... 725/87 |
| 5,734,652 A | * | 3/1998 | Kwok ......................... 370/397 |
| 5,872,589 A | | 2/1999 | Morales |
| 5,969,714 A | * | 10/1999 | Butcher ....................... 725/93 |
| 6,111,882 A | * | 8/2000 | Yamamoto ................... 370/399 |
| 6,188,687 B1 | * | 2/2001 | Mussman et al. ........... 370/486 |
| 6,211,901 B1 | * | 4/2001 | Imajima et al. ............... 725/93 |
| 6,243,388 B1 | * | 6/2001 | Mussman et al. ........... 370/420 |
| 6,362,908 B1 | * | 3/2002 | Kimbrough et al. ........ 398/164 |
| 6,385,167 B1 | * | 5/2002 | Kamo ....................... 370/395.2 |
| 6,411,773 B1 | * | 6/2002 | De Vos et al. .............. 386/125 |
| 6,594,826 B1 | * | 7/2003 | Rao et al. .................... 370/444 |

FOREIGN PATENT DOCUMENTS

GB  2 322 528 A  8/1998

OTHER PUBLICATIONS

European Patent Office Search Report, Dated Jan. 31, 2002, 3 pages.

* cited by examiner

Primary Examiner—Andy Lee

(57) ABSTRACT

A single centralized video controller is employed to convert and distribute video channels to one or more analog TVs (i.e., viewing devices or the like). This is realized without the need for changes to either the TVs or the interconnecting COAX. Specifically, the centralized controller includes one or more MPEG2 decoders, the number of which depends on a desired number of active TVs to be used in viewing different programs, and one or more wireless (e.g., radio frequency (RF)) communications links to television controllers (i.e., remote control units) associated on a one-to-one basis with the desired number of TVs. In operation, channel selection for each of the one or more TVs is communicated up-stream from the centralized controller to a remote video server and, therein, to a video services controller. The video services controller causes the video server to transmit only the selected program channels to the local centralized video controller. However, when the video channel is already being supplied from the video server to an optical line terminal and, specifically, to an optical line card to which the requesting centralized controller is connected to, there is no need to communicate the channel request to the video server. The optical line terminal simply supplies the requested channel via an optical line card to the additional requesting centralized controller and, in turn, to the requesting TV.

36 Claims, 7 Drawing Sheets

100

CENTRALIZED VIDEO CONTROLLER FOR CONTROLLING DISTRIBUTION OF VIDEO SIGNALS

RELATED APPLICATIONS

U.S. patent application Ser. Nos. 09/356,979 and 09/356,980 were filed concurrently herewith.

TECHNICAL FIELD

This invention relates to the distribution of video signals and, more particularly, to controlling the distribution of the video signals.

BACKGROUND OF THE INVENTION

Distribution of video signals to one or more outlets at a location is now typically realized by the use of coaxial cable (COAX). In addition, video terminals connected to the one or more outlets are for the most part analog television sets (TVs). Recently, digital broadband access systems have been proposed, e.g., cable modem, fiber-to-the-home, or the like, which would deliver MPEG2 (Motion Picture Experts Group 2) standard digital video signals. These digital signals must be converted to analog video signals consistent with available TVs, and with COAX signals expected by cable ready TVs. A known approach is the use of an individual set-top-box for each TV, which includes a MPEG2 decoder, a digital-to-analog (D/A) converter, a NTSC (National Television Systems Committee) encoder and a frequency up-converter to deliver the video at the frequency of a selected channel. Typically, the use of an individual set-top-box per TV assumes the availability of all desired video channels at an input of each of the set-top-boxes. The need to deliver all channels to each set-top-box is an inefficient use of the broadband access system. Furthermore, the use of such individual set-top-boxes is inefficient, cumbersome and costly. The inefficiency results because typically only a few of the TVs and associated set-top-boxes are active at any given time.

SUMMARY OF THE INVENTION

Limitations and problems of prior known video signal distribution systems are overcome by employing a single centralized video controller to convert and distribute video channels to one or more analog TVs, i.e., viewing devices or the like. This is realized without the need for changes to either the TVs or the interconnecting COAX, and without the use of a set top box per TV. Indeed, only a remote control unit is needed for each TV. Specifically, the centralized controller includes one or more MPEG2 decoders, the number of which depends on a desired number of active TVs to be used in viewing different video programs on different channels, and one or more wireless, e.g., radio frequency (RF) or infra red, communications links to television controllers, i.e., remote control units, associated on a one-to-one basis with the desired number of TVs.

In operation, channel selection for each of the one or more TVs is typically communicated up-stream from the centralized controller to a video server and a video services controller, therein. The video server only transmits the selected channels to the local centralized video controller. However, when the video channel is already being supplied from the video server to an optical line terminal and, specifically, to an optical line card to which the requesting centralized controller is connected to, there is no need to communicate the channel request to the video server. The optical line terminal simply supplies the requested channel via an optical line card to the additional requesting centralized controller and, in turn, to the requesting TV.

In one embodiment of the invention, each of the one or more active TVs, is assigned one of a plurality of program units included in the centralized controller, and is switched to a video channel that is supplied an analog video signal by the program unit. In this embodiment, each program unit includes a broadband asynchronous transfer mode (ATM) virtual channel (VC) filter, a MPEG2 decoder, a NTSC encoder and a frequency up-converter. The MPEG2 decoder decodes a video signal supplied via the VC and supplies the analog version of the decoded video signal as its output. The analog video signal is NTSC encoded and up-converted to a fixed video channel. The video channel designation corresponds to the assigned MPEG2 decoder and is specified by the centralized video controller. The video channel number is transmitted to the TV remote control unit via a first wireless link and, then, supplied to the TV tuner via an infra red (IR) wireless link. Additionally, the remote control unit communicates channel selections via the first wireless link to the centralized video controller that, in this example, passes the channel selections to a video services controller in a video server using an up-stream communications link. In this example, the up-stream communications link is a broadband ATM VC. In response to the communicated channel selections, the video server transmits the selected channel to the centralized video controller using a down-stream communications link. In this example, the down-stream link is a constant bit rate (CBR) ATM VC. Consequently, the digital video signal is supplied to the centralized video controller as a continuous stream of ATM cells, while the up-stream communications is transmitted as bursts. In this example, a specific VC is statically assigned to each conventional broadcast video channel and other VCs are dynamically assigned for other video services, for example, video-on-demand, or the like. If the program units are all in use supplying video channels to active TVs, additional TVs can tune to any of the supplied video channels but they do not have any "program" selection capability.

In another embodiment of the invention, the up-converter included in each program unit is frequency agile. A video channel selected via the remote control unit is communicated to the centralized video control unit via the first wireless link and is transmitted up-stream to the video server and the video services controller, therein. The selected video program channel is also supplied to the TV tuner via the IR wireless link. Additionally, the MPEG2 decoded video signal is transmitted on the selected program channel. This is realized by dynamically controlling the channel that the video signal is up-converted to by the agile up-converter. Indeed, as the channel selections are made, the associated remote control unit transmits the channel designation to both the TV tuner and the centralized video controller using the IR wireless link and the first wireless link, respectively.

In still another embodiment of the invention, the up-converter has a fixed frequency, i.e., video channel, which is assigned to an associated MPEG2 decoder.

DETAILED DESCRIPTION

Figure 1:
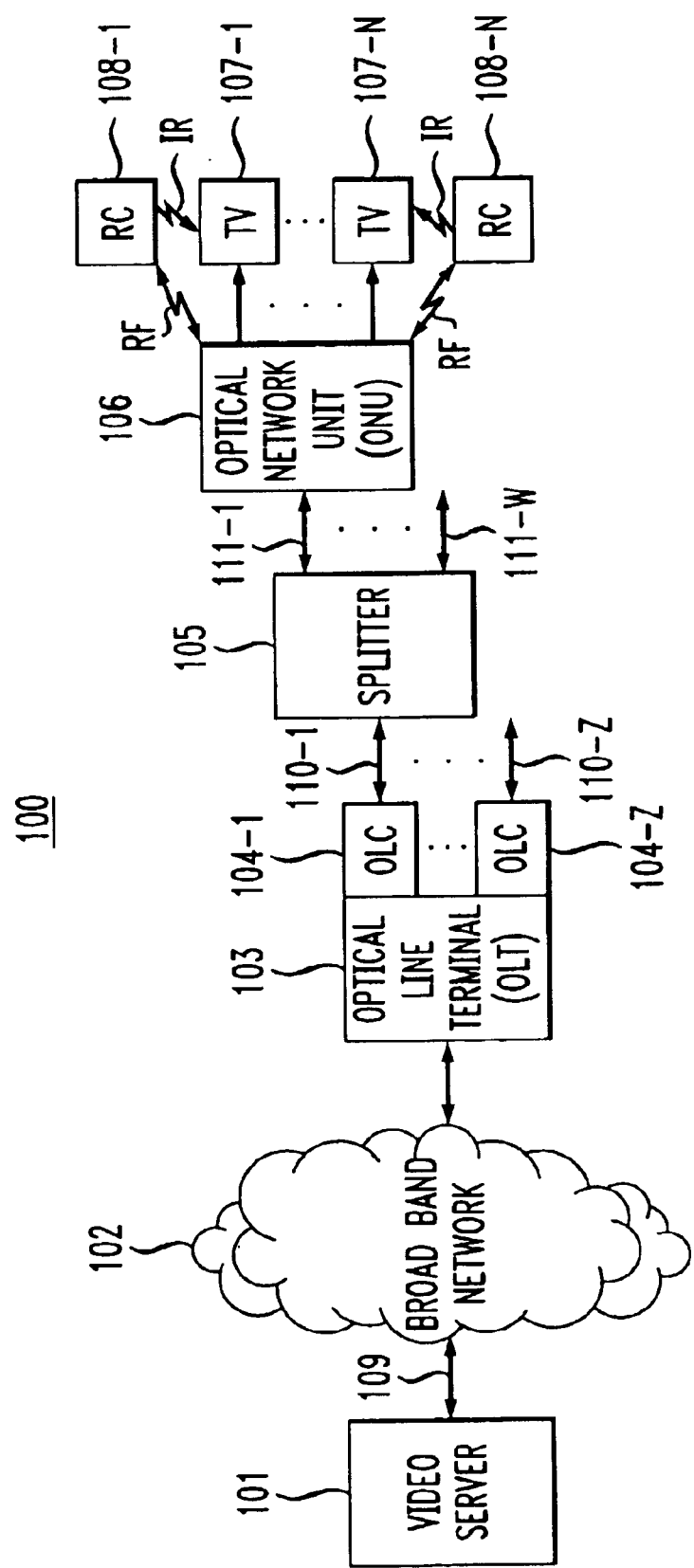
FIG. 1 shows, in simplified block diagram form, a video distribution system employing an embodiment of the invention.

FIG. 1 shows, in simplified block diagram form, a video distribution system employing an embodiment of the invention. Specifically, shown is network 100 including video server 101 which supplies down-stream video signals to broadband network 102, in response to an up-stream communication including a selection message. Broadband network 102 supplies the communications signals to and from optical line terminal 103. At optical line terminal (OLT) 103, optical line circuit (OLC) 104 interfaces to an optical fiber line, The optical fiber line is, for example, a power splitting passive optical network (PSPON) fiber including optical fibers 110 and 111 on which optical signals are transmitted using coarse wavelength division multiplexing. Transmission on the fiber lines 110 and 111 is achieved using two wavelengths, 1550 nano meters (nm) down-streams for example, to a home and 1310 nm up-stream, for example, from the home. The PSPON fibers 110 may be split via passive splitter 105 into a prescribed number of optical fibers 111, for example, 32 fibers 111, thereby interfacing via associated ONUs 106 with 32 locations. Note that OLT 103 serves one or more OLCs 104, namely, 104-1 through 104-Z, coupled to a corresponding number of fiber lines, namely, 110-1 through 110-Z, respectively, and that an OLC 104 serves one or more ONUs 106 via optical fibers 111-1 through 111-W. In this example, the down-stream transmission of video signals is in asynchronous transfer mode (ATM) cells via time division multiplex (TDM), while up-stream transmission of communication is via time division multiple access (TDMA), and both down-stream and up-stream communications is at 155.52 Mb/sec. Efficient TDMA communications in the up-stream direction requires all optical network units (ONUs) 106 to have equal loop delay in relationship to their associated OLC 104. This is realized by employing a ranging procedure that is executed when each ONU 106 associated with a particular OLC 104 is installed, moved, returned to service, or the like. This is realized by employed a ranging procedure that is executed when each ONU 106 is installed. The ranging procedure defines an artificial delay that when added to the transmission loop delay of an ONU 106 yields the required common loop delay. Such ranging arrangements are known in the art. However, a preferred ranging arrangement is described in copending U.S. patent application Ser. No. 09/356,980 filed concurrently herewith and assigned to the assignee of this application.

Actually, OLT 103 is a special ATM switch including a traditional ATM fabric and input/output (I/O) ports. In this example, two types of I/O boards are required, namely, standard SONET (synchronous optical network) boards, e.g., OC-12 units, and OLC units 104. Video signals received from OLT 103 as ATM cells from one or more SONET boards are distributed to the OLC units 104. Because of this, up-stream channel select messages being sent to video services controller 202 in video server 101 are intercepted within the OLT 103, which accumulates the number of viewers of each video program that is OLT 103 wide. Only channel (program) selections that are not available within presently received SONET VCs are passed on to the video services controller 202 in video server 101. Additionally, messages are sent by OLT 103 to video server 101 and, therein, to video services controller 202 whenever a transmitted video program is no longer being viewed by any OLT 103 supported TV 107. It is noted that each of OLC units 104 includes, in this example, a CPU and memory (not shown) that may be a microprocessor with memory.

Optical network unit (ONU) 106 terminates the PSPON fiber 110 via an associated PSPON optical fiber 111, and provides appropriate interfaces, in this example, to one or more television sets (TVs) 107-1 through 107-N. Each of TVs 107-1 through 107-N has an associated one of remote control (RC) units 108-1 through 108-N, respectively.

Network 100 supplies, for example, via one or more video services controller 202 in video server 101 in response to specific program requests, conventional broadcast TV programs, programs similar to those supplied via cable TV providers, satellite TV providers, video on demand and the like. Procedures for requesting and transmitting video programs are described in greater detail below.

As shown in FIG. 1, a residential video subsystem includes an ONU 106 and one or more TVs 107 and associated RC units 108. In this example, ONU 106 and TVs 107 are interconnected via coaxial (COAX) cable.

Figure 2:
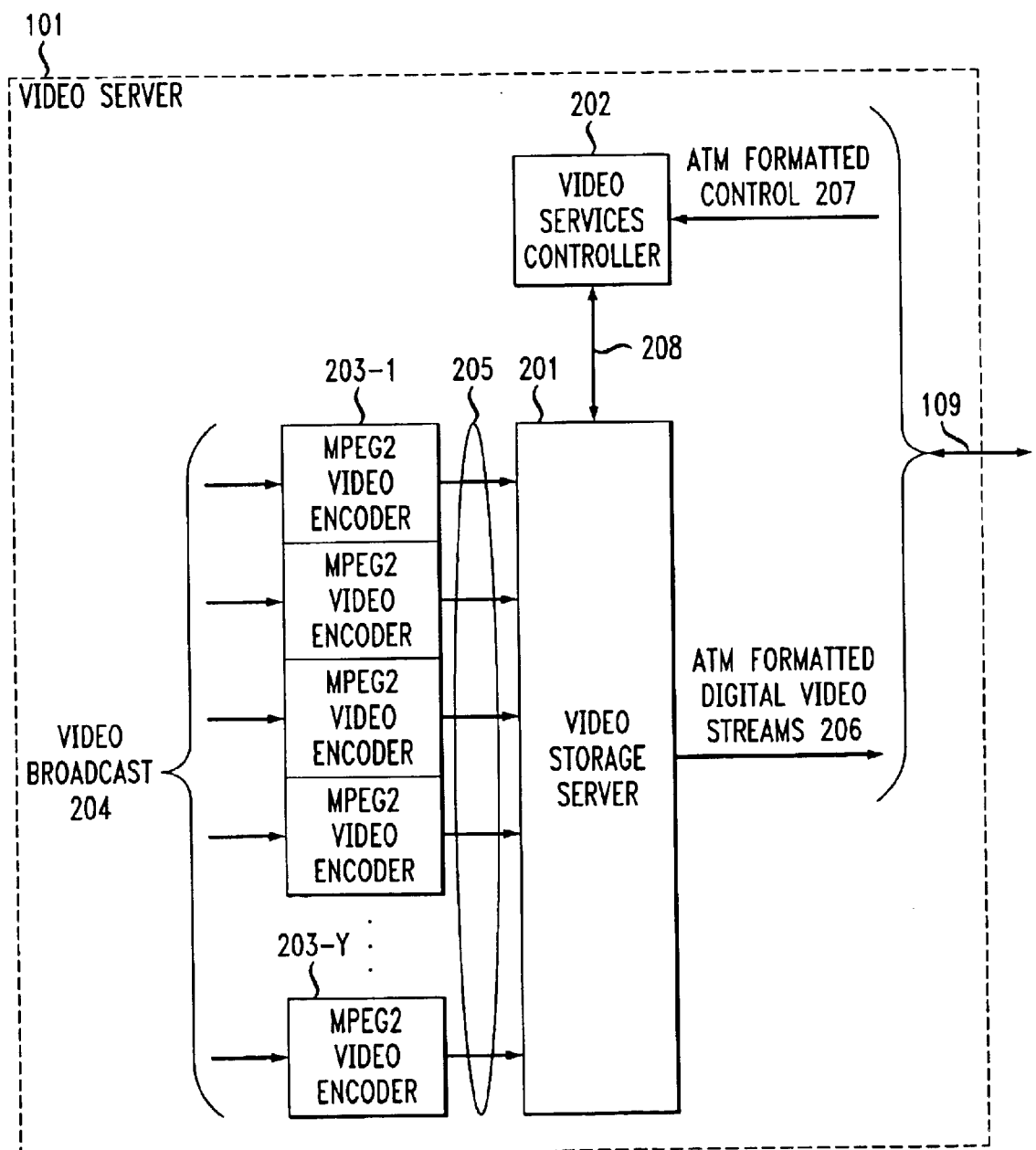
FIG. 2 shows, in simplified block diagram form, details of a video server employed in the embodiment of FIG. 1.

FIG. 2 is a simplified block diagram of video server 101 employed in the system of FIG. 1. Specifically, shown are video storage server 201, video services controller 202 and a block of MPEG2 video encoders 203-1 through 203-Y. Broadcast video signals are received via inputs 204-1 through 204-Y and supplied on a one-to-one basis to MPEG2 video encoders 203-1 through 203-Y, respectively, where they are digitally encoded and compressed in now well known fashion. Thereafter, the digitally encoded MPEG2 video signals are supplied to video storage server 201. As described below in relationship to FIG. 3, video storage server 201 stores the digitally encoded MPEG2 video signals, to be transmitted to subscribers. Other video signals may be prestored in video storage server 201 to support, for example, video-on-demand, or directed advertisement insertion. The transmission of the digitally encoded MPEG2 video signals is in response to control signals from a subscriber and supplied, in this example, via TDMA in ATM cells over transmission link 109 to video server 101 and, therein, via 207 to video services controller 202. In turn, video services controller 202 supplies/and or receives control signals to and/or from video storage server 201. In response to subscriber requests video storage server 201 supplies appropriate video signals including advertisements during commercial intervals or in accordance with the service being provided to one or more subscribers. The video signals are included in ATM cells and formatted as an ATM signal for transmission. Thereafter, the ATM formatted signal is supplied as an output from video server 201 via 206 to bi-directional transmission link 109.

In operation, video server 101 delivers all video signals as MPEG2 encoded video signals. As described above, FIG. 2 shows a block diagram of the video server 101 consisting of a bank of MPEG2 video encoders 203, a video storage server 201, and a video services controller 202. In order to deliver customized advertisement insertion services, all encoded broadcast video signals are delivered through the video storage server 201. Therefore, each digital video signal stream is written to the video storage server 201 in real time, as well as, read from that server 201 in near real time. A read memory pointer in video services controller 202 just simply follows the write pointer, also in controller 202, by some non-zero amount. It is worth noting that the delay between the writing and the reading of a video signal stream is not important. In fact, one possible advanced video service that immediately follows is a "delayed broadcast on demand".

The video service controller 202 manages the writing and reading of all video signal streams, providing independent address information for each digital video signal stream that is written and/or read, as well as ATM virtual circuit (VC) information. In addition, control operations, e.g., "pause", are also provided. In this example, data are written in blocks that are divisible by 48. As data are read, ATM cells are formatted as part of the server's I/O operations and an ATM formatted signal is supplied as an output via 206.

It is assumed that all video VCs are routed to the OLTs 103 (FIG. 1, and associated OLCs 104). Within the OLC 104, only video streams corresponding to VCs being decoded by one or more ONUs 106 on the PSPON fiber line 110 and its associated optical fiber lines 111 are transmitted on the optical fiber. Therefore, remote channel selection is performed within the OLC 104.

Figure 3:
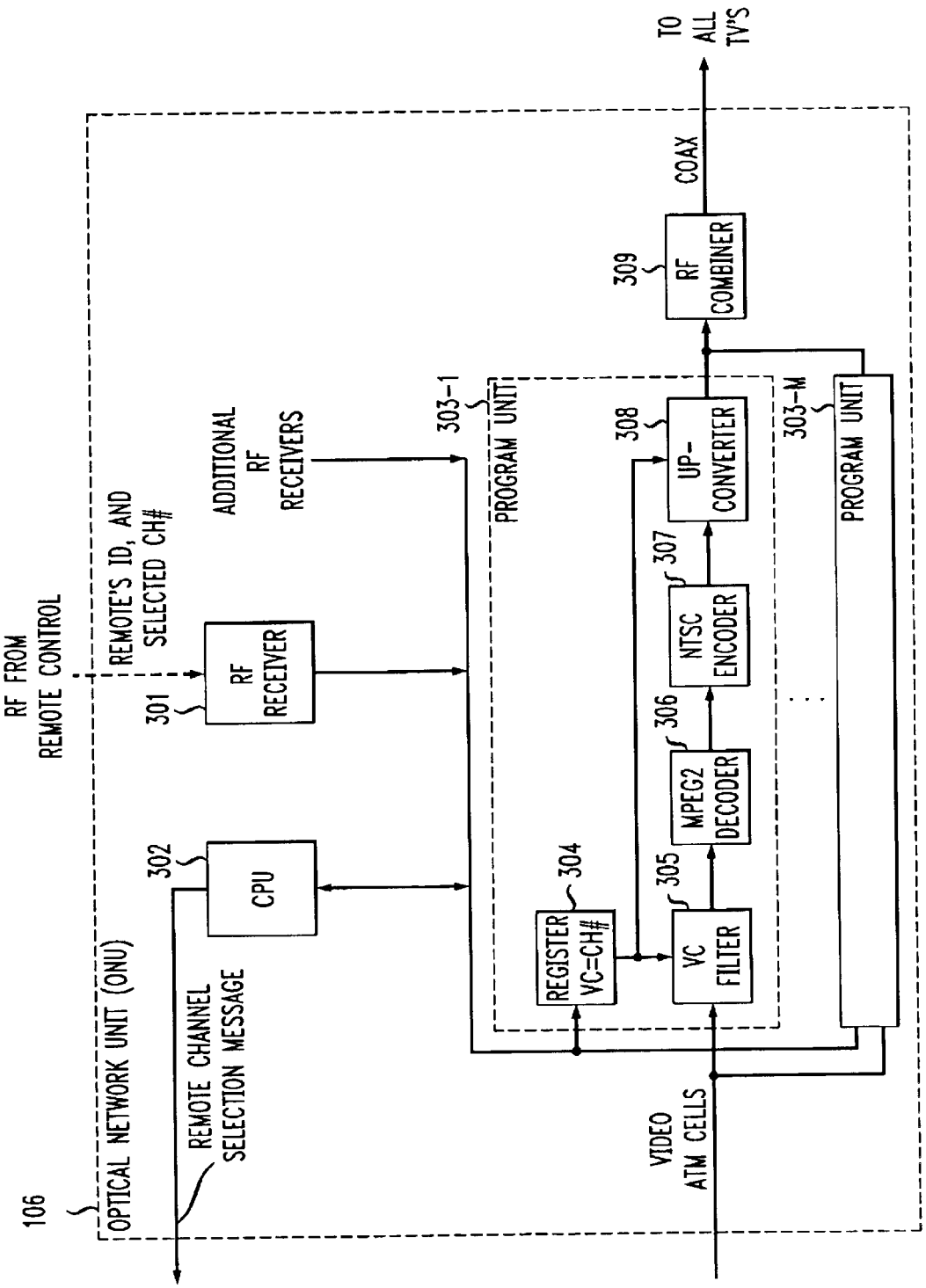
FIG. 3 shows, in simplified block diagram form, details of a centralized video controller employing an embodiment of the invention that may be employed in the system of FIG. 1.

FIG. 3 shows, in simplified block diagram form, details of a centralized video controller, namely, one implementation of ONU 106, employing an embodiment of the invention that may be employed in the system 100 of FIG. 1. In this example, ONU 106 includes at least one radio frequency (RF) receiver 301, CPU 302, one or more program units 303-1 through 303-M and RF combiner 309. It is noted that there must be at least "M" RF receivers 301 corresponding to the number "M" of program units 303. The number of program units 303, i.e., M, defines the number of video programs that can be viewed simultaneously by multiple TVs 107 within a location, e.g., a home. By way of a simple example, if there are four (4) program units then only four programs can be simultaneously viewed. Thus, if there were only four TVs 107 at the location, there would not be any program "blocking". However, if more than four (4) TVs are at the location, then only four (4) different channels may be viewed. The TVs in excess of the first four to have initiated receiving a channel would be restricted to viewing one of the four active channels, and would not have the ability to change a channel being viewed from the four active channels.

RF receiver 301 receives RF signals including control messages from a remote control unit associated with a TV 107 (FIG. 1). This may be realized by employing a RF transmitter in the TV remote control unit, described below in conjunction with FIG. 4, and a RF receiver, both of a type used in a wireless, i.e., cordless, telephone, now well known in the art. Note that there may be a plurality of TVs and a corresponding plurality of remote control units. ONU 106 would include as many RF receivers as there are remote control units. RF control messages include, for example, the associated remote control unit identity (ID) and a selected channel number. Other control messages include, in addition to the remote control ID, for example, an indication that an associated TV has been either powered ON or powered OFF. The information received in the RF control message is supplied to CPU 302. CPU 302 is, for example, a microprocessor including memory. When CPU 302 receives a RF transmission from a previously inactive remote control unit 108, it assigns one of program units 303 to the TV 107 associated with the remote control unit 108, it writes the VC corresponding to the received channel number into register 304 and determines that VC through use of a look-up table. It maintains a count of how many active TVs 107 are tuned to the selected program and it stores the selected channel for this TV 107 in a lookup table. If no other served TV 107 is already tuned to the selected program, CPU 302 transmits a message up-stream to video server 101 and video services controller 202, therein, requesting the transmission of the selected video program. The selected program is transmitted down-stream in ATM cells on the virtual circuit (VC) identified by the selected program channel number and received at the selected program unit 303, in this example, program unit 303-1. The selected channel number's VC and channel number are supplied to virtual circuit (VC) filter 305 and to agile up-converter 308, respectfully, to tune them to the selected program channel.

The selected video program is received at ONU 106 and supplied to VC filter 305 as a sequence of ATM cells. VC filter 305 filters the received signal to obtain the selected program channel signal as a MPEG2 digital video signal, i.e., a compressed digital video signal, that is supplied to MPEG2 decoder 306. In turn, MPEG2 digital decoder 306 yields an analog version of the selected video channel, which is supplied to NTSC encoder 307 where it is encoded. The NTSC encoded signal is then supplied to up-converter 308, where the video signal is frequency converted to the selected standard video channel frequency, i.e., 6 MHz channel. Again, note that up-converter 308 is a so-called agile up-converter that adjusts its frequency to the frequency of the supplied program channel number. The resulting channel signal is supplied to RF combiner 309 where it is combined with channel signals from others of program units 303, if any, and transmitting via COAX to one or more TVs 107, i.e., all the TVs, at the location, e.g., a home.

Figure 4:
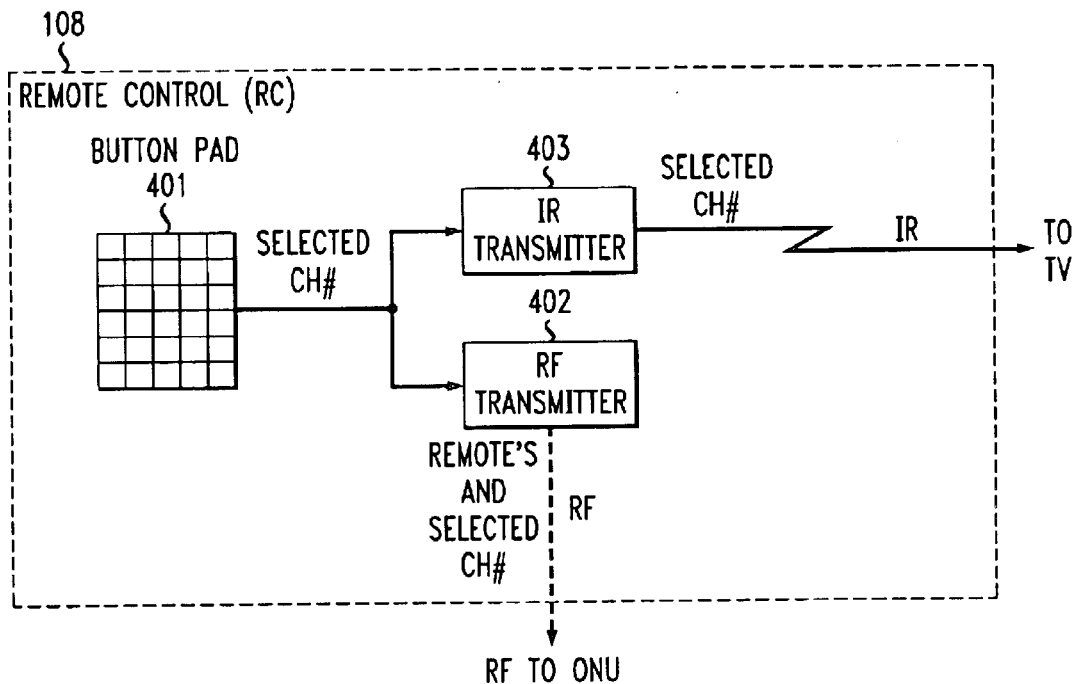
FIG. 4 shows, in simplified block diagram form, details of a remote control unit, including an embodiment of the invention, that may be employed with the video controller of FIG. 3.

FIG. 4 shows, in simplified block diagram form, details of a remote control unit 108 (FIG. 1), including an embodiment of the invention, that may be employed with the video controller of FIG. 3. Shown is button pad 401 for keying a desired channel number that is supplied to RF transmitter 402 and infra red (IR) transmitter 403. RF transmitter 402 transmits to ONU 106 a RF signal, for example, a packet containing a message including the remote unit ID and the selected channel number. IR transmitter 403 transmits an infra red signal in well known fashion to an associated TV 107-1.

In operation, a user turns ON the TV 107-1 by pressing an "ON" button on button pad 401 of remote control 108-1. This results in two communications events. First, a wireless IR signal transmission is made via IR transmitter 403 to the TV 107-1, which turns its power ON in usual fashion. Second, a wireless RF transmission is made via RF transmitter 402 of a control packet containing the identification (ID) of the remote control unit 108-1 and a power ON command. ONU 106 (FIG. 3) via CPU 302 retains knowledge of the channel that each TV 107 at the location was tuned to when the particular TV was last turned OFF, which is the channel that the TV should be initially tuned to when it is turned ON. This is so the TV 107 closely mimics current conventional analog video delivery techniques. ONU 106 utilizes this retained information to perform two operations. First, if the previously viewed channel is not being viewed currently by another TV 107, ONU 106 employs the information to insure that a MPEG2 decoder 306, if one is available, and associated circuitry is assigned to the retained channel, i.e., to the corresponding ATM VC. Second, ONU 106 sends a control packet up-stream to video server 101 (FIG. 1) and, therein, to video services controller 202, requesting that a program on the desired previously viewed channel be transmitted to the ONU 106. Assuming that a MPEG2 decoder 306 is available, the associated TV now displays the program on the channel that the TV was last tuned to prior to being turned OFF.

As a user changes TV channels, using the remote control 108-1, as is done with conventional remote controls, the TV's channel is changed through the IR link. In addition, however, "wireless" RF control messages are transmitted via RF transmitter 402 to the ONU 106 and, therein, to RF receiver 301. ONU 106 appropriately formulates and passes up-stream messages via CPU 302 to the video server 101 and, therein, to a remote video services controller 202 requesting that the transmitted digital video program for that PSPON 110 and 111 be appropriately changed. Also, if not already assigned, a MPEG2 decoder 306 and associated circuitry are assigned. If a digital video program is selected that is already being decoded by a MPEG2 decoder 306, the previously assigned MPEG2 decoder is released. CPU 302 retains information regarding the number of TVs 107 that are viewing each requested video program. When a requested video program is no longer being viewed by any of TVs 107, CPU 302 transmits an up-stream message to video server 101 and, therein, to video services controller 202 indicating that the video program is no longer being viewed.

If the selected program is not a conventional broadcast program, the system operation might be different. For example, if video-on-demand (VOD) is selected, the user is assigned an otherwise unused channel for point-to-point delivery of the interactive video preview/select program. The MPEG2 decoder 306, for this example, is dedicated to that TV 107, remote control 108 pair. Other TVs can also view that video, but its interactive control is disabled, as long as, the TV 107 associated with the initiating remote control 108 is still viewing the program. If the initiating remote control 108 is employed to select a different program, control of the VOD is relinquished and the next remote control 108 that attempts an interactive control function, e.g., pause, is assumed to be the initiating remote control 108. Similarly, other interactive TV applications can be accessed. For some interactive applications, such as games, multiple controlling remote controls 108 are appropriate. In such a situation, however, the application would typically distinguish between the active remote controls 108.

In summary, when CPU 302 (FIG. 3) receives a RF transmission from a previously inactive remote control unit 108, it responds as follows:

if no other active TV 107 is presently viewing the selected program channel number, it assigns a program unit 303;

it writes the selected channel number's VC contained in a look-up table in CPU 302 to register 304;

it maintains a count of how many active TVs 107 are receiving the selected program channel number and stores the selected channel number in the look-up table;

it transmits a message up-stream to video server 101 and, therein, to video services controller 202, requesting the transmission of the selected program channel number on the VC corresponding to the selected program channel number;

if the selected program channel number is presently being viewed by another active TV 107, only the count of how many of TVs 107 are receiving the selected program channel number is updated.

Advantages of the embodiments of FIGS. 3 and 4 are:

the COAX frequency allocation is identical to that used for conventional analog CATV configurations;

recording on a VCR does not require any special VCR procedures due to the conventional COAX frequency allocation, however, a procedure must be defined to reserve a MPEG2 decoder and to insure that the program to be recorded is transmitted on the PSPON fiber 110 and the associated fiber 111 at the appropriate time;

TV features such as the LED display that shows the selected channel number, are still correct;

only a one way "wireless" RF control link is required.

Figure 5:
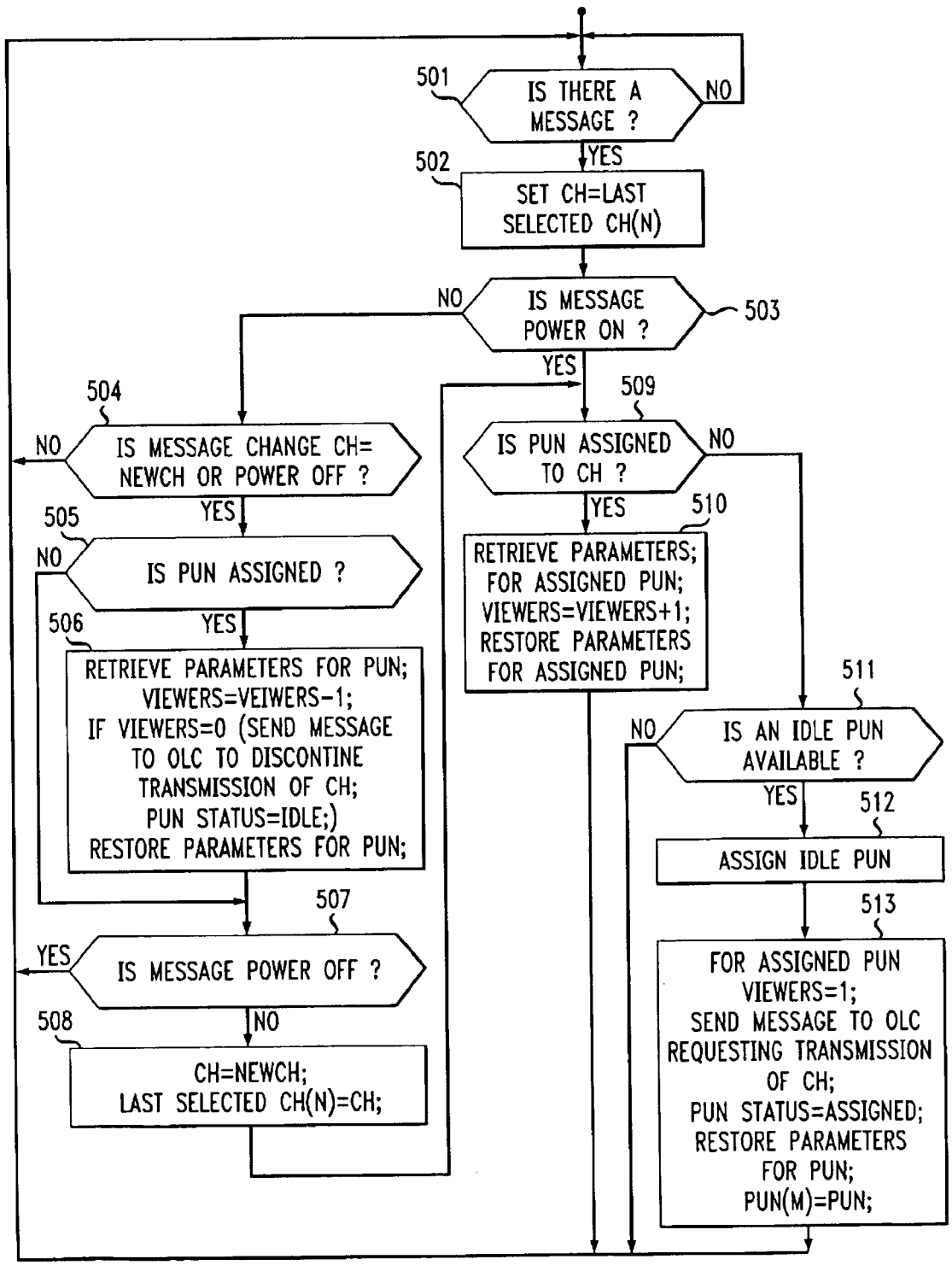
FIG. 5 is a flow chart illustrating steps in the operational process of the centralized video controller of FIG. 3 in the system of FIG. 1.

FIG. 5 is a flow chart illustrating steps in the operational process of the centralized video controller of FIG. 3, namely, ONU 106 including agile up-converter 308, in the system of FIG. 1. Note that parameters for each of program units (PUNs) 303 in ONU 106 include number of viewers, PUN status and the program channel (CH). Now referring to FIG. 5, ONU 106 waits to receive a RF message from a remote control unit 108. Thus, step 501 tests to determine if a message is being received. If the test result in step 501 is NO, step 501 just repeats until the test result is YES and a message has been received that yields a YES result. Then, step 502 causes the program channel (CH) to be set to the last selected channel CH (N), where "N" corresponds to the remote control unit 108. Thereafter, step 503 tests to determine if the message is to turn "power ON". If the test result is YES, control is transferred to step 509. If the test result in step 503 is NO, step 504 tests to determine if the message is to change the program channel, i.e., change CH=NEWCH, or "power OFF". If the tests result in step 504 is NO, control is returned to step 501. If the tests result in step 504 is YES, step 505 tests to determine if a program unit (PUN) 303 (FIG. 3) is assigned. If the test result is NO, control is transferred to step 507. If the test result in step 505 is YES, step 506 causes parameters for the assigned PUN to be retrieved; sets VIEWERS=VIEWERS−1; if VIEWERS=0 send message to OLC 104 to discontinue transmission of CH; sets PUN STATUS=IDLE; and restores parameters for the PUN. Then, step 507 tests to determine if the message was power OFF. If the test result is YES, control is returned to step 501. If the test result in step 507 is NO, step 508 causes the program channel to be set to CH=NEWCH and sets LAST SELECTED CH(N)=CH for the associated remote control unit 108. Thereafter, control is transferred to step 509, which tests to determine if a PUN is assigned to the program channel (CH). If the tests result is YES step 510 causes parameters for the assigned PUN to be retrieved; sets VIEWERS=VIEWERS+1; and restores the parameters for the assigned PUN. If the tests result in step 509 is NO there is no assigned PUN and step 511 tests to determine if an idle PUN is available. If the test result is NO, the selected CH cannot be viewed and control is returned to step 501. If the test result in step 511 is YES, an idle PUN is available and step 512 causes it to be assigned to CH. Thereafter, step 513 causes for the assigned PUN the following: set VIEWERS= 1; send message to OLC requesting transmission of CH; set PUN STATUS=ASSIGNED; restore parameters for PUN; and set PUN(M)=PUN. Then, control is returned to step 501 and ONU 106 waits for a received message.

Figure 6:
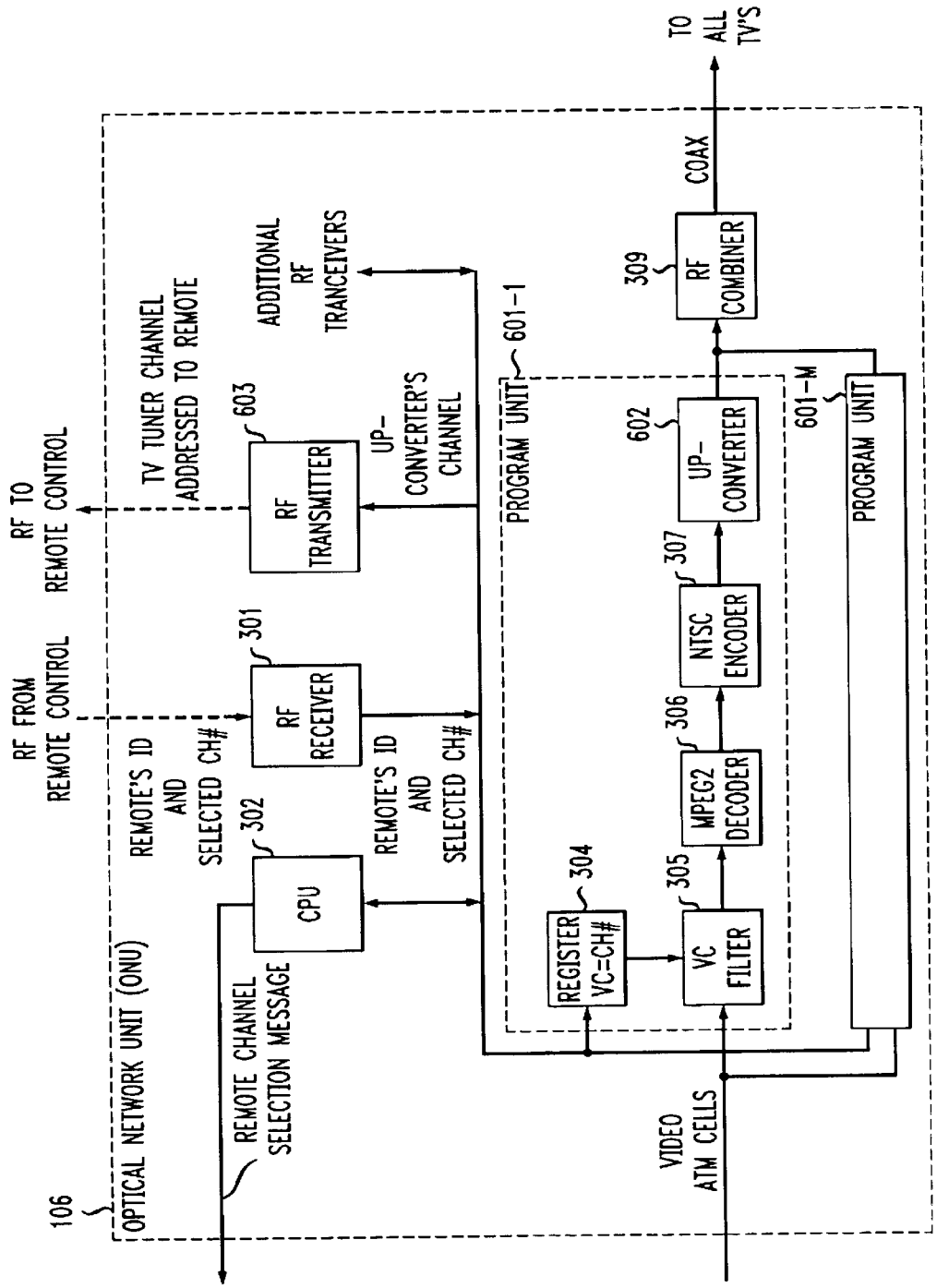
FIG. 6 shows, in simplified block diagram form, details of another centralized video controller employing an embodiment of the invention that may be employed in the system of FIG. 1.

FIG. 6 shows, in simplified block diagram form, details of another centralized video controller employing an embodiment of the invention that may be employed in the system of FIG. 1. In this example, ONU 106 includes at least one radio frequency (RF) receiver 301 and at least one associated RF transmitter 603, CPU 302, one or more program units 601-1 through 601-M and RF combiner 309. It is noted that there are as many RF transceivers including a receiver 301 and transmitter 603, as there are remote units 108. The number of program units 601, i.e., M, defines the number of video programs that can be simultaneously viewed by multiple TVs within a location, e.g., a home. By way of a simple example, if there are four (4) program units than only four programs can be simultaneously viewed. Thus, if there were only four TVs at the location, there would not be any program "blocking". However, if more than four (4) TVs are at the location, then only four (4) different channels may be viewed. The TVs in excess of the first four to have initiated receiving a channel would be restricted to viewing one of the four active channels, and would not have the ability to change a channel being viewed from the four active channels.

As in the embodiment of FIG. 3, RF receiver 301 receives RF signals including control messages from a remote control unit associated with a TV 107 (FIG. 1). This may be realized by employing a RF transmitter 402 in the TV 107 remote control unit 108, described below in conjunction with FIG. 7, and a RF receiver 301, both of the type used in a wireless telephone, which are well known in the art. In this example, each RF receiver 301 has an associated RF transmitter 603 for transmitting a "wireless" RF signal to an associated remote control unit 108 including the fixed channel number that up-converter 602 is tuned to, as described below. Note that there may be a plurality of TVs 107 and a corresponding plurality of remote control units 108. Again, note that ONU 106 would include as many RF receivers and associated RF transmitters, as there are remote control units 108. The received RF control message includes, for example, the associated remote control unit identity (ID) and a selected channel number. Other control messages include, in addition to the remote control ID, an indication of an associated TV being either powered ON or Powered OFF. The information received in the RF control message is supplied to CPU 302. CPU 302 is, for example, a microprocessor including memory. CPU 302 retains a look-up table containing information indicating the last selected program channel number for each of TVs 107, including those of TVs 107 that are currently inactive. When CPU 302 receives a RF transmission from a previously inactive remote control unit 108, it assigns one of program units 601 to the TV associated with the remote control unit, it writes the last selected program channel number into register 304, it writes the RF video program channel number being used by the assigned program unit 601 to RF transmitter 603 which, in turn, transmits the RF signal to the RF receiver in an associated remote control unit 108, it maintains a count of how many active TVs are tuned to the selected channel number and it stores the selected channel number for this TV 107 in a lookup table. If no other served TV 107 is already tuned to the selected channel number, CPU 302 transmits a message up-stream to video server 101 and a video services controller 202, therein, requesting the transmission of the selected channel. The selected channel is transmitted down-stream in ATM cells on the virtual circuit (VC) identified by the selected program channel number and received at the selected program unit 601, in this example, program unit 601-1. The selected channel number's VC is supplied to virtual circuit (VC) filter 305 to tune it to the selected program channel.

Again, the selected video program channel is received at ONU 106 and supplied to VC filter 305 as a sequence of ATM cells. VC filter 305 obtains the selected program channel signal as a MPEG2 digital video signal that is supplied to MPEG2 decoder 306. In turn, MPEG2 digital decoder 306 yields an analog version of the selected video channel that is supplied to NTSC encoder 307 where it is encoded. The NTSC encoded signal is then supplied to up-converter 602 where the video signal is frequency converted to a predetermined standard video channel frequency, i.e., 6 MHz channel. The resulting channel signal is supplied to RF combiner 309 where it is combined with channel signals from others of program units 601, if any, and transmitted via COAX to one or more TVs 107 at the location, e.g., a home.

Figure 7:
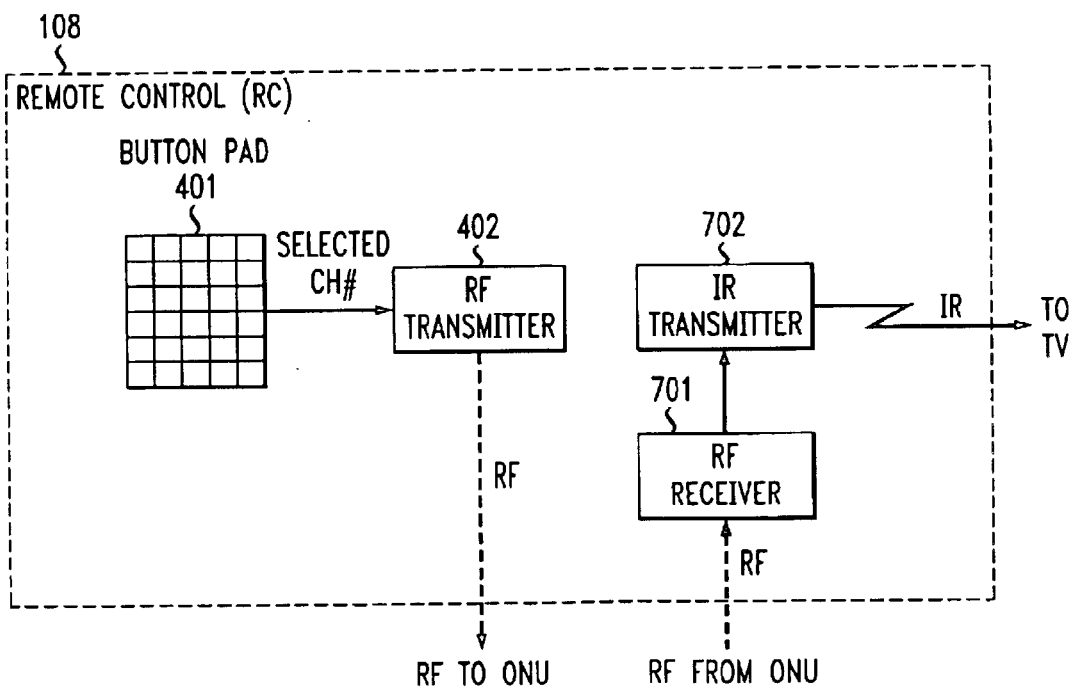
FIG. 7 shows, in simplified block diagram form, details of a remote control unit, including an embodiment of the invention, that may be employed with the video controller of FIG. 6.

FIG. 7 shows, in simplified block diagram form, details of a remote control unit 108 (FIG. 1), including an embodiment of the invention, that may be employed with the video controller 106 of FIG. 6. Shown is button pad 401 for keying a desired channel number that is supplied to RF transmitter 402. RF transmitter 402 transmits a RF packet signal including the remote units ID and the selected channel number to ONU 106. RF receiver 701 receives the RF signal including the RF video program channel number of up-converter 602 of the assigned program unit 601 from RF transmitter 603 (FIG. 5) and supplies the channel number to IR transmitter 702. In turn, IR transmitter 702 transmits an infra red signal in well known fashion to an associated TV 107.

ONU 106 of FIG. 6 has a fixed channel, i.e., RF frequency, assigned to each MPEG2 decoder 306, actually its up-converter 602. Therefore, the video signal from each MPEG2 decoder 306 of FIG. 6 is always transmitted on the same channel. A TV 107 would be assigned a MPEG2 decoder 306 when it is turned ON. The VC is changed as channels are changed, but the TV 107 stays tuned to the channel number of the MPEG2 decoder 306 it was assigned.

As in ONU 106 of FIG. 3, the user turns on the TV 107 by pressing the "power ON" button of the associated remote control 108. This directly results in only one communications event. A "wireless" RF control packet containing the identification of the remote control, and the "power ON" command is sent to the ONU 106. The ONU 106 retains knowledge of the channel each TV 107 was tuned to when it was last turned OFF and, therefore, the channel that should be initially delivered to that TV 107 to closely mimic conventional analog video delivery techniques. As described above, the ONU 106 uses that information to perform three operations. First, it insures that a MPEG2 decoder 306, if one is available, and associated circuitry is assigned to that video channel (i.e. that ATM VC). In addition, if the selected program channel is not being viewed by another of TVs 107, ONU 106 sends a control packet up-stream to video server 101 and, therein, to video services controller 202, requesting that the selected program channel, i.e., VC, be transmitted on that access PSPON fiber 110 and fiber 111 associated with the ONU 106. Finally, the ONU 106 transmits a return "wireless" control message back to the associated remote control 108 containing the channel number used by the assigned MPEG2 decoder 306. In response, the remote control 108 sends an IR transmission to the associated TV 107, turning its power ON, and tuning it to the designated channel. Assuming that a MPEG2 decoder 306 was available, that TV 107 now displays the program of the channel that TV was displaying when last turned OFF.

As a user changes TV channels using the remote control 108 as is done with conventional remote controls, the "wireless" RF control messages are transmitted to the ONU 106 indicating those channel changes. The ONU 106 appropriately changes the MPEG2 decoder's VC, and passes up-stream messages requesting that the transmitted digital video channels for that PSPON 110 and the associated fiber 11 be appropriately changed.

If a MPEG2 decoder 306 is not available, which is only possible if there are more TVs 107 than decoders 306, the TV 107 will display noise unless the selected channel is one already being decoded for another TV 107. In that situation, a "wireless" RF control message is sent to the remote control 108, and passed to the associated TV 107 using the IR link, appropriately changing TV channels. Only the remote control 108 that selected the program can change it. However, if that TV 107 is turned OFF, the next remote control 108 to attempt to change the channel will be given control of that MPEG2 decoder 306.

In summary, when CPU 302 (FIG. 6) receives a RF transmission from a previously inactive remote control unit 108, it responds as follows:

- if no other active TV 107 is presently viewing the selected program channel number, it assigns a program unit 303;
- it writes the selected channel number's VC contained in a look-up table in CPU 302 to register 304;
- it maintains a count of how many active TVs 107 are receiving the selected program channel number and stores the selected channel number in the lookup table;
- it transmits a message up-stream to video server 101 and, therein, to video services controller 202, requesting the transmission of the selected program channel number on the VC=selected program channel number;
- if the selected program channel number is presently being viewed by another active TV 107, only the count of how many of TVs 107 are receiving the selected program channel number is updated;
- it transmits a RF message to the corresponding remote control unit 108 containing the last selected channel number.

Advantages of the embodiments of FIGS. 6 and 7 are: the up-converter 608 need not be frequency agile.

Figure 8:
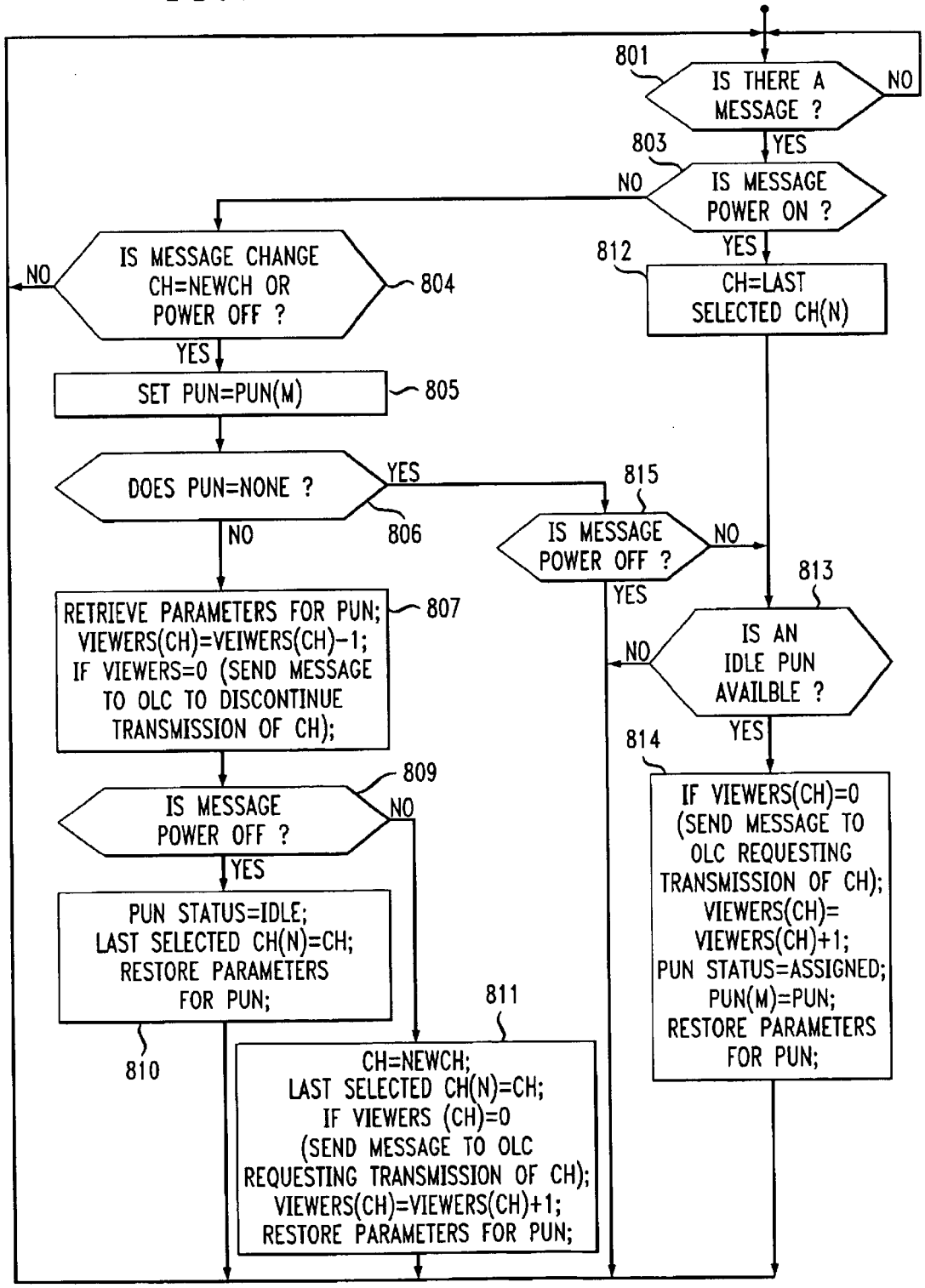
FIG. 8 is a flow chart illustrating steps in the operational process of the centralized video controller of FIG. 6 in the system of FIG. 1.

FIG. 8 is a flow chart illustrating steps in the operational process of the centralized video controller of FIG. 6 in the system of FIG. 1. namely, ONU 106 including fixed frequency up-converter 608, in the system of FIG. 1. Note that parameters for each of program units (PUNs) 601 in ONU 106 include PUN status and the program channel (CH). Now referring to FIG. 8, ONU 106 waits to receive a RF message from a remote control unit 108. Thus, step 801 tests to determine if a message is being received. If the test result in step 801 is NO, step 801 just repeats until the test result is YES, and a message has been received that yields a YES result. Thereafter, step 803 tests to determine if the message is to turn "power ON". If the test result is YES, control is transferred to step 812. If the test result in step 803 is NO, step 804 tests to determine if the message is to change the program channel, i.e., change CH=NEWCH, or "power OFF". If the tests result in step 804 is NO, control is returned to step 801. If the tests result in step 804 is YES, step 805 causes the setting of PUN=PUN(M). Thereafter, step 806 tests to determine if PUN=NONE. If the test result is YES, control is transferred to step 815. If the test result instep 806 is NO, step 807 causes parameters to be retrieved for the PUN: setting of VIEWERS(CH)=VIEWERS(CH)−1; and if VIEWERS=0 a message is sent to OLC to discontinue transmission of CH. Then step 809 tests to determine if the message is power OFF. If the test result is YES, step 810 causes setting PUN STATUS=IDLE; setting last selected CH(N)=CH where "N" is a corresponding one of remote control units 108-1 through 108-N; and restoration of the parameters for PUN. Thereafter, control is returned to step 801. If the test result in step 809 is NO, step 811 causes the setting of CH=NEWCH; setting of last selected CH(N)=CH; if VIEWERS(CH)=0 sending a message to OLC requesting transmission of CH; setting VIEWERS(CH)=VIEWERS (CH)+1; and restoration of parameters for PUN. Then, control is transferred to step 801. Returning to step 815, which tests to determine if the message is power OFF, if the test result is YES, control is returned to step 801. If the test result in step 815 is NO, control is transferred to step 813. Returning to step 812, it causes the setting of CH=LAST SELECTED CH(N) and control is transferred to step 813. Step 813 tests to determine if an idle PUN is available. If the test result is NO, control is returned to step 813 and the CH cannot presently be viewed. If the tests result in step 813 is YES, a PUN is available. Then, step 814 causes the following: if VIEWERS(CH)=0, send message to OLC requesting transmission of CH; setting of VIEWERS(CH)=VIEWERS (CH)+1; setting PUN STATUS=ASSIGNED; setting PUN (M)=PUN; and restoring parameters for PUN. Thereafter, control is returned to step 801 where ONU 106 waits for a message.

It should be noted that in the above embodiments a location, e.g., a house, may have more active TVs than there are Program Units, however, only a number of different video channels may be viewed at the location equal to the number of program units in an associated ONU.

The above-described embodiments are, of course, merely illustrative of the principles of the invention. Indeed, numerous other methods or apparatus may be devised by those skilled in the art without departing from the spirit and scope of the invention.

What is claimed is:

1. Apparatus for use at a prescribed local location to control the provision of video channels from a remote source at a remote location from the prescribed local location to a plurality of television sets at the prescribed local location, the apparatus comprising:

a plurality of receivers associated with at least a prescribed number of said plurality of television sets for receiving control messages associated with said at least a prescribed number of said plurality of television sets, said plurality of receivers including a prescribed number of receivers equal to a prescribed number of video program units in a plurality of video program units, and wherein said control messages each includes at least a first field for containing an identity related to an associated one of said prescribed number of television sets and a second field for containing a selected channel number;

a generator supplied with said received control messages for generating video channel selection messages;

a transmitter for transmitting said video channel selection messages toward said source for controlling said remote source to supply video programs on a one-to-one basis corresponding to said video channel selection messages;

said plurality of video program units, each for receiving video channels transmitted from said remote source in response to said transmitted video channel selection messages and for supplying as an output a video channel carrying video program signals on said selected channel, each of said video program units including a storage unit for storing a selected channel number identifying a particular video program unit with a selected channel number;

a combiner for combining said received video channel from each of said plurality of video program units, a resulting combined video channel signal to be supplied as an output to said plurality of television sets; and a processor for assigning said video program units to selected channel numbers on a one-to-one basis, wherein said processor stores the current video channel to which associated television sets are tuned to and upon any of said associated television sets being powered ON said processor assigns a program channel unit to it to supply the last stored channel to which said associated television set was tuned to prior to it being powered OFF, wherein a set-top terminal is not required to control video channel selection and/or transmission.

2. The invention as defined in claim 1 wherein said receivers are wireless receivers.

3. The invention as defined in claim 2 wherein said wireless receivers are radio frequency (RF) receivers.

4. The invention as defined in claim 1 wherein said control messages each includes a third field for containing an indication that said associated television set has been either powered ON or powered OFF.

5. The invention as defined in claim 1 wherein video program signals carried by said selected video channels are supplied to said video program units as compressed digital video signals, and wherein each of said video program units includes a decoder for decoding said compressed digital video signals to generate an analog video signal version of a supplied video program signal, an encoder for encoding the analog video signal into NSTC video signal form and an up-converter for converting the frequency of the NSTC video signal to a prescribed video channel frequency.

6. The invention as defined in claim 5 wherein said up-converter is an agile up-converter being responsive to said stored channel number for converting the frequency of said NSTC video signal to that of the stored video channel.

7. The invention as defined in claim 5 wherein said up-converter converts the frequency of said NSTC video signal to a fixed channel frequency.

8. The invention as defined in claim 7 further including a plurality of transmitters for transmitting control messages indicative of the channel carrying video program signals from each of said video program units.

9. The invention as defined in claim 5 wherein said selected channels carrying said compressed digital video signals are supplied in asynchronous transfer mode (ATM) cells in an ATM virtual circuit (VC) assigned to the selected channel number on which video programs are to be received, and wherein each of said video program units further includes a VC filter supplied with the VC assigned to the video program unit for filtered out the assigned VC from an incoming ATM signal.

10. The invention as defined in claim 9 wherein said decoder in each of said video program units is a motion picture experts group 2 (MPEG2) decoder.

11. Apparatus for use at a prescribed local location to control the provision of video channels from a remote source at a remote location from the prescribed local location to a plurality of television sets at the prescribed local location, the apparatus comprising:

a plurality of first means associated with at least a prescribed number of said plurality of television sets for receiving control messages associated with said at least prescribed number of said plurality of television sets, said plurality of first means including a prescribed number of receivers equal to a prescribed number of video program units in a plurality of second means, and wherein said control messages each includes at least a first field for containing an identity related to an associated one of said prescribed number of television sets, a second field for containing a selected channel number and another field for containing an indication that said associated television set has been either powered ON or powered OFF;

means supplied with said received control messages for generating video channel selection messages;

means for transmitting said video channel selection messages toward said remote source;

said plurality of second means, each for receiving video channels transmitted from said remote source in response to said transmitted video channel selection messages and for supplying as an output a video channel carrying video program signals on said selected channel; and means for combining said video channel from each of said plurality of second means, a resulting combined video channel signal to be supplied as an output to said plurality of television sets, wherein a set-top terminal is not required to control video channel selection and/or transmission.

12. The invention as defined in claim 11 wherein each of said first means is a wireless receiver.

13. The invention as defined in claim 11 wherein said control messages each includes third field for containing a selected channel number.

14. The invention as defined in claim 13 further including means for assigning said plurality of second means to selected channel numbers on a one-to-one basis.

15. The invention as defined in claim 14 wherein each of said second means units includes a means for storing a selected channel number identifying a particular video program unit with a selected channel number.

16. The invention as defined in claim 14 wherein video program signals carried by said selected video channels are supplied to said second means as compressed digital video signals, and wherein each of said second means includes means for decoding said compressed digital video signals to generate an analog video signal version of a supplied video program signal, means for encoding the analog video signal into NSTC video signal form and an means for converting the frequency of the NSTC video signal to a prescribed video channel frequency.

17. The invention as defined in claim 16 wherein said selected video channels carrying said compressed digital video signals are supplied in asynchronous transfer mode (ATM) cells in an ATM virtual circuit (VC) assigned to the selected channel number on which video programs are to be received, and wherein each of said second means further includes means supplied with the VC assigned to the video program unit for filtered out the assigned VC from an incoming ATM signal.

18. The invention as defined in claim 16 wherein said means for decoding in each of said second means is a motion picture experts group 2 (MPEG2) decoder.

19. A system for controllably supplying video channels from a remote source at a remote location to a plurality of television sets at an at least one local location remote from said remote location comprising:

at least one video controller, said at least one video controller being located at a local location and including a plurality of receivers associated with at least a prescribed number of said plurality of television sets for receiving control messages from said at least prescribed number of said plurality of television sets, said plurality of receivers in said at least one video controller including a prescribed number of receivers equal to a prescribed number of video program units in a plurality of video program units, wherein said control messages each includes at least a first field for containing an identity related to an associated one of said prescribed number of television sets and a second field for containing an indication that said associated television set has been either powered ON or powered OFF, a generator supplied with said received control messages for generating video channel selection messages, a transmitter for transmitting said video channel selection control messages toward a remote source of video channels for controlling said remote source to supply video programs on a one-to-one basis corresponding to said video channel selection messages, said plurality of video program units, each for receiving video channels transmitted from said remote source in response to said transmitted video channel selection messages and for supplying as an output a video channel carrying video program signals on said selected channel, and a combiner for combining said received video channel from each of said plurality of video program units, a resulting combined video channel signal to be supplied as an output to said plurality of television sets, wherein a set-top terminal is not required to control video channel selection and/or transmission; and said remote source of video channels at said remote location including a plurality of digital encoders for encoding video program signals supplied to said video storage server into compressed digital video program signals, a video storage server for storing video programs to be supplied on said video channels, and a video services controller responsive to supplied channel selection control messages from said video controller for controlling said video storage server to supply as an output the selected video channels, said selected video channels being supplied to at least one requesting video controller.

20. The invention as defined in claim 19 wherein said receivers are wireless receivers.

21. The invention as defined in claim 19 wherein said control messages each includes third field for containing a selected channel number.

22. The invention as defined in claim 21 further including a processor for assigning said video program units to selected channel numbers on a one-to-one basis.

23. The invention as defined in claim 22 wherein each of said video program units includes a storage unit for storing a selected channel number identifying a particular video program unit with a selected channels number.

24. The invention as defined in claim 22 wherein video program signals carried by said selected video channels are supplied to said video program units as compressed digital video signals, and wherein each of said video program units includes a decoder for decoding said compressed digital video signals to generate an analog video signal version of a supplied video program signal, an encoder for encoding the analog video signal into NSTC video signal form and an up-converter for converting the frequency of the NSTC video signal to a prescribed video channel frequency.

25. The invention as defined in claim 19 wherein said selected channels carrying said compressed digital video signals are supplied in asynchronous transfer mode (ATM) cells in an ATM virtual circuit (VC) assigned to the selected channel number on which video programs are to be received, and wherein each of said video program units further includes a VC filter supplied with the VC assigned to the video program unit for filtered out the assigned VC from an incoming ATM signal.

26. The invention as defined in claim 22 wherein said remote source further includes a distribution processor for storing information indicating which and where selected video channels are being distributed.

27. The invention as defined in claim 26 wherein said distribution processor in response to video channel selection control signals from one or more video controllers determines if a selected channel is presently being distributed and if so, also distributes said selected video channel to the one or more video controllers that have selected to receive said video channel.

28. The invention as defined by claim 22 wherein said digital encoders are motion picture experts group 2 (MPEG2) encoders.

29. The invention as defined in claim 22 wherein said selected channels carrying said compressed digital video signals are supplied from said remote source in asynchronous transfer mode (ATM) cells in an ATM virtual circuit (VC) assigned to the selected channel number on which video programs are to be received.

30. The invention as defined in claim 29 wherein each of said video program units in said at least one video control further includes a VC filter supplied with the VC assigned to the video program unit for filtered out the assigned VC from an incoming ATM signal.

31. A method for use at a prescribed local location to control the provision of video channels from a remote source at a remote location to a plurality of television sets at the prescribed local location, the method comprising the steps of:

receiving control messages associated with at least a prescribed number of television sets in a plurality of television sets, wherein said control messages each includes at least a first field for containing an identity related to an associated one of said prescribed number of television sets and a second field for containing an indication that said associated television set has been either powered ON or powered OFF;

in response to said received control messages, generating video channel selection messages;

transmitting said video channel selection messages toward said remote source;

receiving video channels on one or more of a plurality of program units transmitted from said remote source in response to said transmitted video channel selection messages;

supplying as an output a video channel carrying video program signals on said selected channel; and combining said video channel from each of said plurality of program units, a resulting combined video channel signal to be supplied as an output to said plurality of television sets, wherein a set-top terminal is not required to control video channel selection and/or transmission.

32. The method as defined in claim 31 wherein a number of said control messages being received is equal to a prescribed number of video program units associated with said prescribed number of television sets.

33. The method as defined in claim 31 wherein said control messages each includes third field for containing a selected channel number.

34. The method as defined in claim 31 further including the step of assigning said video program units to selected channel numbers on a one-to-one basis.

35. The method as defined in claim 34 further including the step of storing a selected channel number identifying a particular video program unit with a selected channel number.

36. A method for controllably supplying video channels from a remote source at a remote location to a plurality of television sets at one or more local locations including at least one video controller, the method comprising the steps of:

at said at least one video controller receiving control messages associated with at least a prescribed number of television sets in a plurality of television sets, wherein said control messages each includes at least a first field for containing an identity related to an associated one of said prescribed number of television sets and a second field for containing an indication that said associated television set has been either powered ON or powered OFF, in response to said received control messages, generating video channel selection messages;

transmitting said video channel selection messages toward said remote source;

receiving video channels on one or more of a plurality of program units transmitted from said remote source in response to said transmitted video channel selection messages:

supplying as an output a video channel carrying video program signals on said selected channel, and combining said video channel from each of said plurality of program units, a resulting combined video channel signal to be supplied as an output to said plurality of television sets, wherein a set-top terminal is not required to control video channel selection and/or transmission; and at said remote source of video channels at said remote location storing video programs on said video channels, and in responsive to supplied channel selection control messages, controlling supplying as an output the selected video channels including prescribed video programs, said selected video channels being supplied to at least one requesting video controller.

\* \* \* \* \*